Aug. 11, 1953   R. C. HENSHAW   2,648,510
RESILIENT MOUNTING
Filed July 2, 1948

Inventor
Richard C. Henshaw
By
Ralph Hammar
Attorney

Patented Aug. 11, 1953

2,648,510

UNITED STATES PATENT OFFICE 2,648,510

RESILIENT MOUNTING

Richard C. Henshaw, Erie, Pa., assignor to Lord Manufacturing Company, Erie, Pa., a corporation of Pennsylvania Application July 2, 1948, Serial No. 36,709

3 Claims. (Cl. 248—8)

Automobile engines, under operating conditions, are subject to vibration creating disturbing forces in many directions, some of which originate in the engine, and others in the associated driving and driven parts. The problem of isolating engine vibrations is further complicated by the requirement that the engine and drive shaft be accurately aligned. It is also necessary that the mountings be adjustable to compensate for set. This invention is intended to provide a mounting system which will accomplish these objectives. Further objects and advantages appear in the specification and claims.

Figure 4:
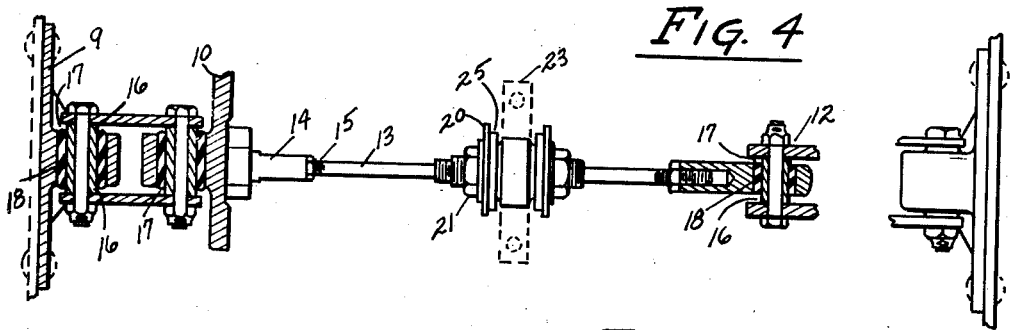
Figure 3:
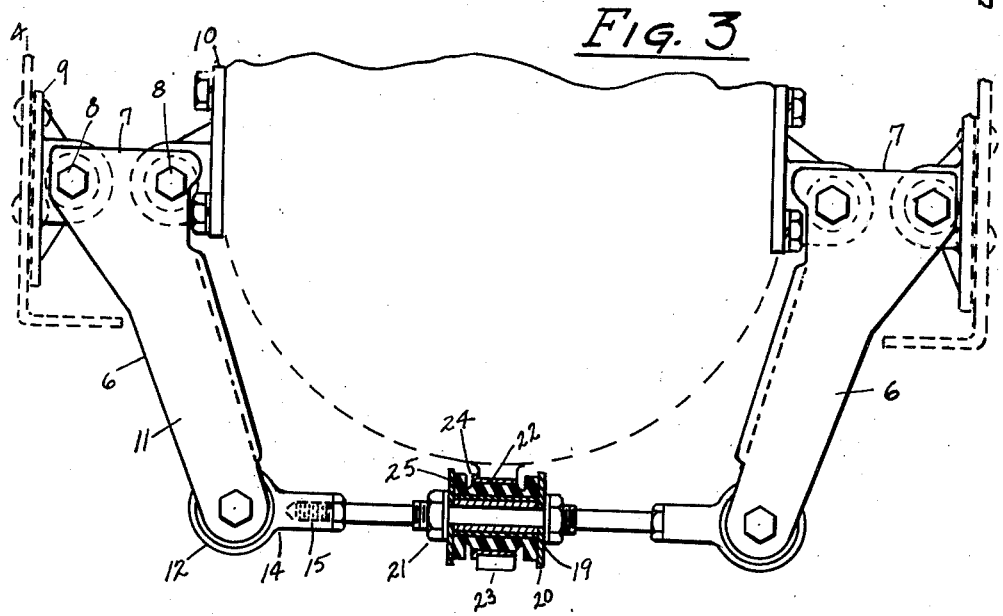
Figures 1, 2:
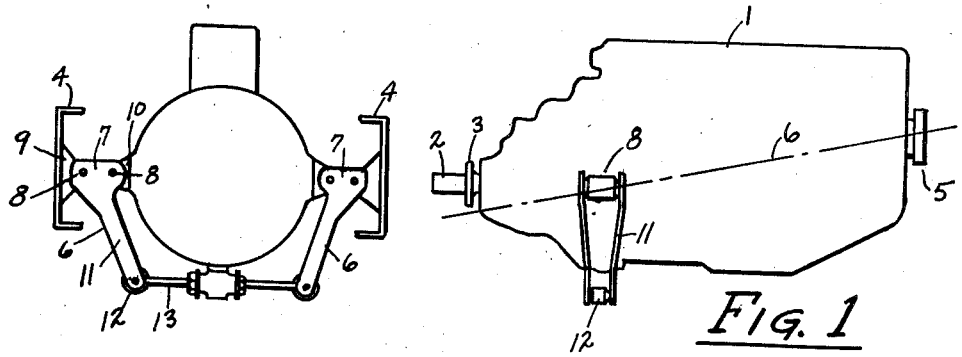

In the drawing, Fig. 1 is a diagrammatic side view of an automobile engine mounting; Fig. 2 is a rear elevation; Fig. 3 is an enlarged rear elevation partly in section, and Fig. 4 is a sectional top plan view.

In the drawing, 1 indicates an automobile engine, 2 the drive shaft with its associated universal joint 3, and 4 the automobile side frame members. These parts are, or may be, of common construction.

At the front the engine is carried by a support 5 preferably located on the axis 6 passing through the center of gravity of the engine, about which the engine tends to vibrate torsionally. The support 5 may be any common construction which will permit free torsional vibration of the engine. The construction of the support 5 is not critical. It may, for example, consist of a trunnion bearing or a stiff pad of rubber. At the rear or drive shaft end, the engine is supported by two bell cranks 6 which are, in effect, T- or L-shaped crank levers. Each of the bell cranks has horizontal arms 7, having hinge connections 8 at each end connected respectively to brackets 9 and 10 on the side frame and engine. The bell cranks have depending arms 11, having hinge joints 12 and their free ends connected by a tie rod 13. Each of the joints 12 has an eye 14 with a threaded connection 15 to the tie rod. By making one of the threaded connections 15 with a left hand thread and the other with a right hand thread, turning of the tie rod 13 raises and lowers the engine so as to permit alignment of the engine with the drive shaft. This is important for reducing the vibration level in the universal joint. The adjustment also permits compensation for set in the mounting. The hinge joints 8 and 12 are tube form joints having an inner metal sleeve 16 fixed to the bell crank and surrounded by a sleeve of resilient material 17, having its outer surface locked to cylindrical surfaces 18 in the brackets 9 and 10, and in the eye 14. The rubber may be bonded to the sleeve 16 and the surfaces 18, or it may be held against the parts by frictional engagement. The axis of each of the hinge joint members 8 and 12 is parallel to the axis of the engine. In each of the hinge joint members the weight of the engine is carried primarily by compression of the rubber between the metal sleeves 16 and the surfaces 18. The thickness of the rubber is proportioned so that the natural frequency of vibration of the engine in a vertical direction is of the order of 1,000 cycles per minute. This is substantially above the vibration frequencies excited by the tires, which ordinarily occur in the neighborhood of 600 cycles per minute. The result is a relatively stiff support for the engine which avoids resonance with vibrations transverse to the engine axis. While the rubber joints are relatively stiff, the joints do prevent the direct conduction of sound through the joints. Although preferable, it is not necessary that all of the hinge joints be rubber joints. The advantages will be obtained if only one of the joints is a rubber joint.

The stability of the engine support in a lateral direction is increased by the fact that the arms 7 of the bell cranks are substantially horizontal. Sidewise or lateral thrusts are accordingly transmitted substantially along the length of the arms. Another advantage of this construction is that the arms 7 exert substantially no spreading force against the side frames. This is true even when the vertical position of the engine is adjusted by means of the tie rod 13. In the preferred form the arms 7 are located in a plane passing through the axis of the drive shaft 2. This locates the elastic center of the mounting in the plane of the drive shaft and prevents lateral movement or translation of the drive shaft.

Torsional vibration of the engine is controlled primarily by a tube form mounting having a center sleeve 19 surrounding the tie rod and located thereon by washers 20 clamped against the ends by nuts 21. The tube form mounting has an outer sleeve 22 seated in a bracket 23 on the engine. Between the sleeves 19 and 22 is a cylindrical body of rubber 24 bonded at its inner and outer surfaces to the sleeves. Under the engine torque the outer sleeve 22 is moved in a clockwise direction. This causes a rocking of the bell cranks 6 in the direction to cause an opposite movement of the tie rod 13 resulting in a shear stress of the rubber between the sleeves 19 and 22. Under extreme vibrations such as may occur during resonance, or under heavy torque, the outer sleeve 22 comes up against snubbing washers 25 on the inner faces of the washers 20. These snubbing washers offer a substantially greater resistance due to the fact that the snubbing washers sustain the load primarily in compression. By means of the nuts 21 it is possible to adjust the position of the tube form mounting along the tie rod 13 so that under idling conditions the sleeve 22 does not contact the snubbing washers. This provides the softest support for the torsional vibrations and permits isolation of the relatively low frequency vibrations occurring during idling and at low speeds. At the higher speeds where, due to the higher torque, the sleeve 22 may contact the snubbing washers 25, effective isolation of the torque vibrations is still obtained even though a greater resistance is offered by the snubbing washers. This mounting system permits a very soft resistance to torsional vibrations which is desirable for vibration isolation without interfering with the stability of the engine mounting. The resistance to torsional vibrations is substantially independent of the balance of the mounting. It is accordingly possible to use the same mounting for engines having a wide range of weight and torque characteristics by merely changing the stiffness of the tube form mounting surrounding the tie rod 13. This is possible because the rubber in the hinge joints 8 and 12 is relatively stiff and therefore little influenced by changes in engine weight.

What I claim as new is:

1. In an automobile having an engine or propulsion equipment between supporting side frames, bell cranks on each side of the engine having horizontal arms extending crosswise of the engine axis, hinge joints at each end of the arms connecting the arms respectively to the engine and the adjacent side frame, at least one of the joints comprising inner and outer joint members with resilient material such as rubber therebetween sustaining the vertical and horizontal thrusts transverse to the axis of the joint in compression, the stiffness of the resilient material being such as to provide a support having a natural vibrational frequency in a vertical direction above the vibrational frequencies transmitted through the side frames, vertical arms on the bell cranks, a tie rod connected between the free ends of the vertical arms and including adjustment means for moving the free ends of the vertical arms toward and away from each other to raise and lower the engine, and a resilient connection between the engine and tie rod resisting movement of the engine relative to the tie rod.

2. In an automobile having an engine or propulsion equipment between supporting side frames, bell cranks on each side of the engine having horizontal arms extending crosswise of the engine axis, hinge joints at each end of the arms connecting the arms respectively to the engine and the adjacent side frame, at least one of the joints comprising inner and outer joint members with resilient material such as rubber therebetween sustaining the vertical and horizontal thrusts transverse to the axis of the joint in compression, the stiffness of the resilient material being such as to provide a support having a natural vibrational frequency in a vertical direction above the vibrational frequencies transmitted through the side frames, vertical arms on the bell cranks, a tie rod connected between the free ends of the vertical arms and including adjustment means for moving the free ends of the vertical arms toward and away from each other to raise and lower the engine, and a sleeve of resilient material such as rubber surrounding the tie rod and having its inner surface fixed to the tie rod and its outer surface fixed to the engine.

3. In an automobile having an engine or propulsion equipment between supporting side frames, bell cranks on each side of the engine having horizontal arms extending crosswise of the engine axis, hinge joints at each end of the arms connecting the arms respectively to the engine and the adjacent side frame, at least one of the joints comprising inner and outer joint members with resilient material such as rubber therebetween sustaining the vertical and horizontal thrusts transverse to the axis of the joint in compression, the stiffness of the resilient material being such as to provide a support having a natural vibrational frequency in a vertical direction above the vibrational frequencies transmitted through the side frames, vertical arms on the bell cranks, a tie member connected between the free ends of the vertical arms and including adjustment means for moving the free ends of vertical arms toward and away from each other to raise and lower the engine, and means resiliently resisting lengthwise movement of the engine relative to the tie member.

RICHARD C. HENSHAW.

References Cited in the file of this patent

UNITED STATES PATENTS

| Number | Name | Date |
|---|---|---|
| 1,120,243 | Royce | Dec. 8, 1914 |
| 1,161,531 | Royce | Nov. 23, 1915 |
| 1,648,061 | Royce | Nov. 8, 1927 |
| 2,028,550 | Lord | Jan. 21, 1936 |

FOREIGN PATENTS

| Number | Country | Date |
|---|---|---|
| 10,890 | Great Britain | May 8, 1930 |
| 407,974 | Great Britain | Mar. 26, 1934 |